UNITED STATES PATENT OFFICE.

LEWIS S. CHICHESTER, OF BROOKLYN, NEW YORK, ASSIGNOR TO CHARLES F. CHICHESTER, OF SAME PLACE.

IMPROVEMENT IN FOOD COMPOUNDS.

Specification forming part of Letters Patent No. 136,303, dated February 25, 1873.

*To all whom it may concern:*

Be it known that I, LEWIS S. CHICHESTER, of Brooklyn, in the county of Kings and State of New York, have invented an Improved Food Compound, of which the following is a specification:

This new article invented by me is particularly adapted to the food of persons whose business does not afford much exercise, such as students, accountants, and professional men.

I make use of desiccated wheat and barley in about equal proportions, and ground of a sufficiently-coarse quality; and the preparation in the form of wheat and barley granules is put up into packages of suitable size for transportation and sale. It is to be used as an article of food after boiling to form a mush or semi-solid mass, or molded into cakes or bread. The drying or desiccating and grinding are to be performed in any suitable apparatus and mill.

Desiccated wheat and barley when mixed in about equal proportions, are composed of about 16.41 parts nitrates, 76.25 parts carbonates, 3.34 parts phosphates, and 4 parts water; and, in addition to forming a very palatable article of food, the fibrous or waste portions are sufficient to keep the bowels moved with regularity. The component parts are such as to supply that which is required to nourish the brain and keep the body in proper condition, even with persons deprived of outdoor exercise.

I claim as my invention—

The new article of manufacture, consisting of barley and wheat granules mixed and desiccated, as set forth.

Signed by me this 12th day of August, A. D. 1872.

LEWIS S. CHICHESTER.

Witnesses:
GEO. T. PINCKNEY.
CHAS. H. SMITH.